United States Patent [19]

Billings

[11] Patent Number: 4,715,938

[45] Date of Patent: Dec. 29, 1987

[54] METHOD AND APPARATUS FOR ELECTROLYZING WATER

[76] Inventor: Roger E. Billings, 3420 Pink Hill Circle, Blue Springs, Mo. 64015

[21] Appl. No.: 926,721

[22] Filed: Nov. 4, 1986

Related U.S. Application Data

[63] Continuation of Ser. No. 844,694, Mar. 27, 1986.

[51] Int. Cl.$^4$ .............................................. C28B 1/02
[52] U.S. Cl. ................... 204/129; 204/258; 204/263; 204/266; 204/275; 204/278; 204/283; 204/284
[58] Field of Search ............... 204/129, 263, 266, 283, 204/258, 284, 275, 278

[56] References Cited

U.S. PATENT DOCUMENTS

| | | | |
|---|---|---|---|
| 4,056,452 | 11/1977 | Campbell | 204/258 |
| 4,057,479 | 11/1977 | Campbell | 204/258 |
| 4,177,118 | 12/1979 | Campbell | 204/129 |
| 4,210,511 | 7/1980 | Campbell et al. | 204/256 |
| 4,280,883 | 7/1981 | Raetzsch | 204/258 |

Primary Examiner—R. L. Andrews
Attorney, Agent, or Firm—Litman, McMahon & Brown

[57] ABSTRACT

An electrolysis apparatus for electrolysis of water comprises a series of cells, each cell including a substantially open porous anode plate and a substantially open porous cathode plate with a solid electrolyte membrane therebetween. First and second flow passages extend through the cells, with the first flow passage comprising bores extending through the centers of the cathode plates, the anode plates, and the membranes; the bores in the cathode plates being fitted with annular sealing gaskets. The second flow passage also comprises bores extending through the cathode plates, the anode plates, and the membranes, with the bores in the anode plates being fitted with annular sealing gaskets. A seal is provided at the outside perimeter of the cathode plate, to prevent the escape of fluid, containing hydrogen, therefrom. During operation, water is driven into the first flow passage. The water diffuses through the anode plate from the central bore, and partial electrolysis occurs. Water which reaches an outer perimeter of the anode plate, without electrolysis, drains from the assembly, providing a means for cooling. Ions formed can migrate to the cathode plate, whereat hydrogen gas is formed, the products being evacuated from the apparatus.

18 Claims, 2 Drawing Figures

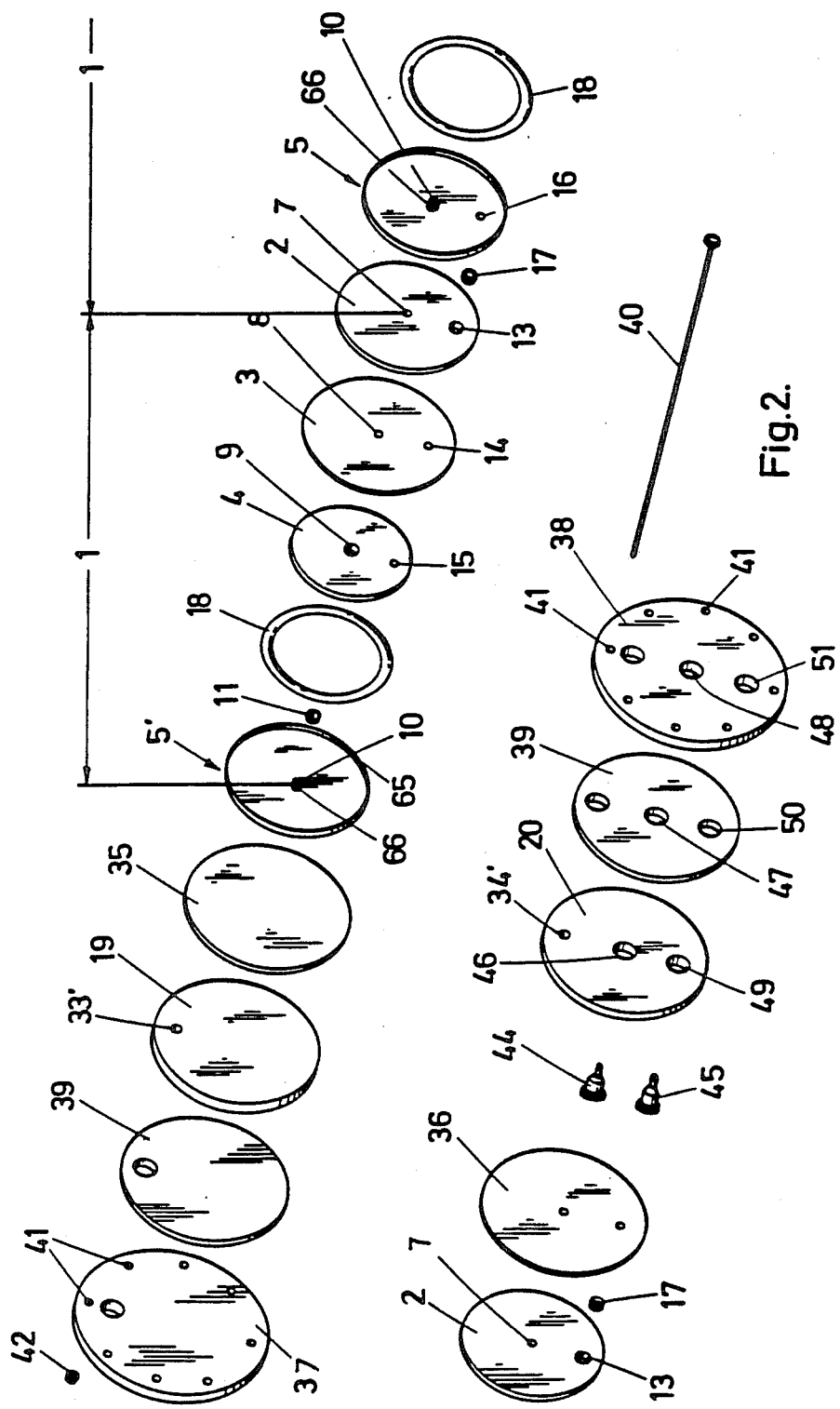

METHOD AND APPARATUS FOR ELECTROLYZING WATER

CROSS REFERENCE TO RELATED APPLICATIONS

This is a Continuation of copending application Ser. No. 844,694, filed Mar. 27, 1986,

BACKGROUND OF THE INVENTION

The present invention relates to electrolyzers and in particular to electrode structures for electrolyzers. The invention also relates to a method for electrolyzing water, through the use of a preferred electrolyzer apparatus.

The technology of producing hydrogen by the electrolysis of water dates back to the last century. Generally, the process has been accomplished by placing electrodes into a water solution containing electrolyte material, often potassium hydroxide or hydrochloric acid. When an appropriate electrical current is passed through the electrodes, by applying an electric potential between them, oxygen bubbles form at one electrode and hydrogen bubbles form at the other. The gases may then be collected, purified and used.

Commercial electrolysis equipment, utilizing this technology, has been available for many years. A recent development in the area has been the substitution of a solid polymer type membrane material between the two electrodes, making possible the electrolysis of substantially pure water, i.e. water without substantial electrolytes added. This is advantageous since it yields more efficient conversion and generally includes lower cell maintenance cost. A solid polymer electrolyte also provides the capability of producing hydrogen at relatively high pressure, thereby at least partially eliminating the need for potentially expensive and energy intensive secondary compressors.

Solid polymer electrolytes (SPE) are well known and have been described in the following publications:

"Solid Electrolytes Offer Route to Hydrogen", *Chemical and Engineering News,* Aug. 27, 1973; "Electrolytic Hydrogen Fuel Production With Solid Polymer Electrolyte Technology"; Tigterinton, W. A. and Fickett, A. P.; *VIII IECEC Proceedings;* and "A Hydrogen-Energy System", published by American Gas Association, 1973. As indicated by these references, an SPE is typically a solid plastic sheet of perfluorinated sulfonic acid polymer which, when saturated with water, becomes an excellent ionic conductor. The ionic conductivity apparently results from the great mobility of ions, for movement through the polymer sheet, by passing from one sulfonic acid group to another. An anode and cathode are positioned on either side of the sheet, and are generally pressed thereagainst to form the desired SPE cell.

Electrolysis devices utilizing such an SPE cell are described in U.S. Pat. Nos. 4,056,452 and 4,210,511. In these devices, the anode plates have, on at least one of their sides, alternating ridges and grooves. This generally makes the anode plates costly, since the grooves are relatively expensive to fabricate.

Further, as for example in the electrolyzer of U.S. Pat. No. 4,210,511, these conventional systems have required back-up rings for supporting outer seal members that are used to seal the outer perimeter of the cathodes and to prevent escape of water containing hydrogen therefrom. Typically, the back-up rings have been machined from fiberglass or similar materials and have thus been relatively expensive.

With such conventional electrolyzers or electrolyzing apparatus, there have been problems with rupturing during use, sometimes causing severe damage to the cell and substantial downtime. In particular, pressure within the cell may cause rupturing of the relatively expensive back-up rings. In addition, usually very tight tolerances must be used in such conventional cells, especially in the fabrication of the back-up rings, in order to achieve proper sealing. When a large diameter cell is desired, these tight tolerances will tend to make the back-up rings one of the more expensive parts of the cell.

OBJECTS OF THE INVENTION

Therefore the objects of the present invention are: to provide an improved electrolyzer or electrolysis apparatus which is generally more reliable and preferably less costly than normal electrolyzers of the prior art; to provide an electrolyzer which has improved means for supplying liquid to the anode plates and for withdrawing fluid and products formed at the anode and cathode plates; to provide such an electrolyzer for use wherein the anode plates are not required to have alternating grooves and ridges therein; to provide a new method for electrolysis of a liquid including water, to produce hydrogen and oxygen therefrom, through the utilization of a new electrolysis apparatus; to provide such a method and apparatus generally less likely to rupture and generally less subject to substantial damage from rupturing than conventional apparatus; to provide such an apparatus which is relatively easy to manufacture, simple to use and which is particularly well adapted for the proposed usages thereof; and, to provide such a method which is relatively easy and inexpensive to effect.

Other objects and advantages of this invention will become apparent from the following descriptions, taken in connection with the accompanying drawings, wherein are set forth by way of illustration and example certain embodiments of this invention.

SUMMARY OF THE INVENTION

An electrolyzer or electrolysis apparatus is provided which may comprise a single cell or plurality of cells arranged in series. Each cell comprises an electrode structure made up of an anode plate, a cathode plate and a solid electrolyte membrane, which are preferably secured together in a side-by-side relationship. Generally, the solid electrolyte membrane is positioned between the anode and cathode plates, separating same for effective electrolysis. In embodiments wherein the electrolyzer comprises a plurality of cells which have been assembled as a unitary multi-celled unit, separator plates are preferably positioned between adjacent cells.

In the preferred embodiments the anode and cathode plates are constructed from a porous, electrically conductive, material, such as sintered titanium. On the other hand, the separator plates, while composed of conductive material, are generally non-porous. Thus, generally water and electrolysis products do not flow directly from cell to cell, due to the presence of the separator plates.

In accordance with the invention, a single cell, or each individual cell, comprises the following elements: (a) substantially open porous anode and cathode plates which are disposed on either side of, and in contact with, a solid electrolyte membrane, the anode and cathode plates being composed of electrically conductive material capable of being permeated by a liquid such as water; (b) a first flow passage preferably comprising concentrically aligned bores, the first flow passage preferably extending longitudinally through the cell and also extending substantially through the centers of the cathode plate, the anode plate and the membrane of each cell, with the bore in the cathode plate being fitted with seal means such as an annular sealing gasket; (c) a second flow passage also preferably comprising concentrically aligned bores, preferably extending longitudinally through the cell and thus extending substantially through the cathode plate, the anode plate and the membrane; the second flow passage being spaced from the first flow passage and being preferably substantially parallel thereto, with the bore in the anode plate being fitted with an annular sealing gasket; (d) sealing means at the outer perimeter of the cathode plate; (e) means for securing the cathode plate, membrane and anode plate in firm side-by-side series engagement; (f) fluid flow directing means for applying to the first flow passage a liquid flowing substantially radially through the porous anode plate and wetting the membrane, so that certain products produced at the interface of the membrane and the anode plate can diffuse through the porous anode plate and be carried radially away with the liquid to the outside perimeter of the anode plate, and so that certain products produced at the interface of the membrane and the cathode plate can diffuse through the porous cathode plate to the second flow passage; and (g) means for applying a direct current to the cathode and anode plates.

In the preferred embodiment both sides of the anode plate are relatively flat. Thus, the anode plates are relatively inexpensive to manufacture.

An alternate statement of the present invention is the provision of an electrolysis apparatus which includes the following: (a) anode and cathode plates that are disposed on either side of, and in contact with, a solid electrolyte membrane, the anode and cathode plates being composed of an electrically conductive material, whereby at least the cathode plate is capable of being permeated by a liquid such as water; (b) at least one flow passage, in particular a product evacuation passage, comprising concentrically aligned bores extending through the cathode plate, the anode plate and the membrane; (c) a separator or supporting plate, composed of solid non-porous electrically conductive material, which is positioned with one of its sides in contact with a side of the cathode plate that is opposed to the side of the cathode plate facing the membrane, the separator plate having means at its perimeter for holding an annular sealing gasket around an outside perimeter of the cathode plate; (d) means for securing the cathode plate, membrane, anode plate and separator or supporting plate in firm side-by-side series engagement; and (e) fluid flow directing means for applying a liquid to wet the anode plate and the membrane, so that certain products produced at the interface of the membrane and anode plate may be carried away with a liquid to an outer perimeter of the anode plate, and so that certain products produced at the interface of the membrane and the cathode plate can diffuse through the porous cathode plate to the product evacuation passage.

The instant invention also relates to a method for electrolysis of liquid, generally water, to produce hydrogen and oxygen therefrom, which method generally comprises: (a) positioning a solid electrolyte membrane between an open porous anode plate and an open porous cathode plate, the anode and cathode plates contacting mutually opposite sides of a membrane; (b) wetting with water the surfaces of the anode and cathode plates, which abut the membrane, by conveying water substantially radially from the center of the anode plate through the porous structure thereof, in a direction generally toward the anode plate perimeter; and (c) passing a current through the membrane, and between the anode plate and the cathode plate, to generate hydrogen gas at the cathode plate and oxygen gas at the anode plate. Preferably, the method involves the use of a preferred electrolysis apparatus such as that described herein.

The drawings constitute a part of this specification and show exemplary embodiments of the present invention while illustrating various objects and features thereof. In some instances material thicknesses may be shown exaggerated for clarity.

BRIEF DESCRIPTION OF THE DRAWINGS

FIG. 2 is an exploded perspective view of a portion of the apparatus depicted in FIG. 1.

DETAILED DESCRIPTION OF THE PREFERRED EMBODIMENT

Figure 1:
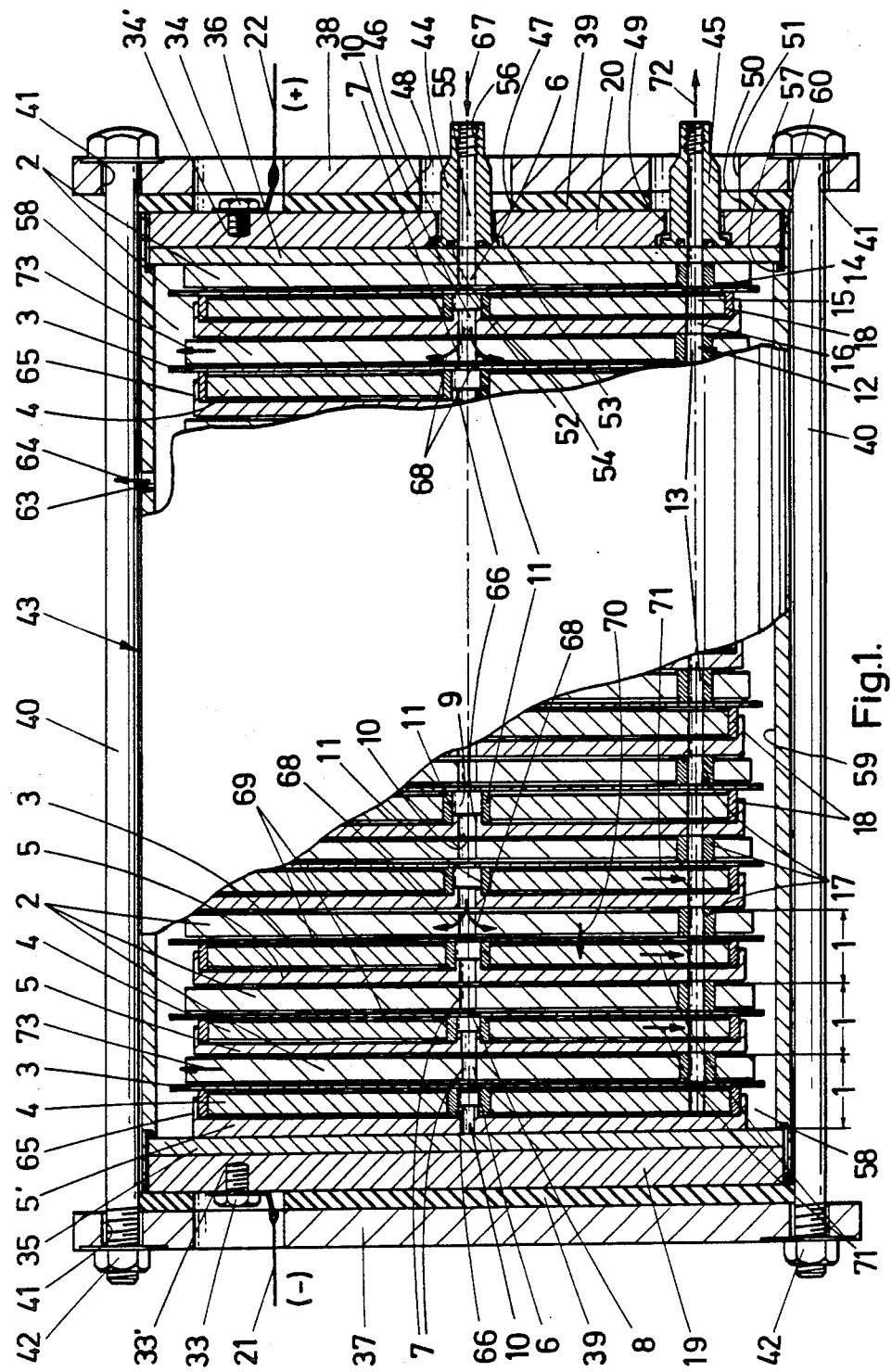
FIG. 1 is a side elevational view of an electrolysis apparatus according to the present invention, with portions cut away, and shown in vertical cross-section, for viewing internal portions thereof.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but rather merely as a basis for the claims and as a representative basis for teaching one skilled in the art to variously employ the present invention in virtually any appropriately detailed structure.

FIG. 1 generally depicts an electrolyzer or electrolysis apparatus according to the present invention. The preferred electrolysis apparatus of FIG. 1 comprises a plurality of successive cells 1, aligned in series with one another. It is foreseen, however, that in alternate embodiments an electrolysis apparatus can be made with only one cell therein.

Each of the cells 1 includes an open porous anode plate 2, a solid electrolyte membrane 3 and an open porous cathode plate 4, FIG. 2. Preferably, one side of the anode plate 2 is in contact with one side of the membrane 3, and the other side of the membrane 3 is in contact with one side of the cathode plate 4. That is, the membrane 3 is sandwiched between the anode plate 2 and the cathode plate 4, separating same.

In the preferred embodiment described and shown, the anode plate 2, cathode plate 4, and membrane 3 are generally circular or disklike in configuration, with each having an outer circular perimeter or edge. However, it will be understood that alternate shapes may be used, with appropriate modifications.

Preferably, the anode plate 2 and cathode plate 4 are manufactured from an open porous electrically conductive material capable of being permeated by a liquid, such as water. By "open porous" it is to be understood that pores in the plates communicate substantially at random with one another, so as to form flow channels which are substantially equally distributed over the whole volume of the substrate from which the anode plate 2 and cathode plate 4 are made. Preferably the anode plate 2 and cathode plate 4 are manufactured from sintered titanium, according to conventional methods.

In an electrolyzer such as that depicted in FIG. 1, containing a plurality of cells 1, generally each cell 1 is identical and is connected in series, the cells 1 being separated by means of separator plates 5, composed of a solid non-porous electrically conductive material positioned between each cell 1. In the preferred embodiment, FIG. 1, the separator plates 5 are generally circular in configuration, with an outer periphery, and are preferably manufactured from titanium. It is again noted that preferably the separator plates 5 are non-porous, that is fluid does not readily flow therethrough, except by means of passageways described hereinbelow.

Referring to FIG. 1, separator plate 5 is viewable sandwiched between two successive cells 1, specifically between the cathode plate 4 of one cell and the anode plate 2 of the next adjacent cell. In this manner, the separator plates 5 generally inhibit flow of fluid between cells 1, except as directed by flow channels, again to be described below.

Referring to FIG. 1, generally the anode plates 2, membranes 3, cathode plates 4 and separator plates 5 are concentrically aligned side-by-side, with each abutting the next adjacent member. The result is a plurality of cells 1 aligned in series.

Referring to FIG. 1, the electrolysis apparatus includes at least two flow passages therein, which generally penetrate, longitudinally, through the different successive cells 1 from one end of the electrolyzer or electrolysis apparatus to the opposite end thereof. In the preferred embodiment the two flow passages are independent of one another and extend generally parallel to one another. Generally, reference numeral 6 designates a first flow passage which preferably extends through the centers, respectively, of each of the anode plates 2, the membranes 3, the cathode plates 4 and the separator plates 5. The first flow passage 6 is formed from concentrically aligned bores 7, 8, 9 and 10. Bores 7 are formed in the anode plates 2, bores 8 in the membranes 3, bores 9 in the cathode plates 4 and bores 10 in the separator plates 5. The bore 9 of each cathode plate 4, FIG. 2, is provided with a seal means, in the embodiment shown annular sealing gasket 11, a preferably non-porous member formed from an O-ring type seal or similar member.

Referring again to FIG. 1, the electrolysis apparatus generally includes a second flow passage 12, which in the preferred embodiment is parallel to the first flow passage 6 and generally extends longitudinally from one end of the apparatus to the other. In the preferred embodiment the second flow passage 12 is formed from concentrically aligned bores 13, 14, 15 and 16 which extend through each of the anode plates 2, membranes 3, cathode plates 4 and intermediate separator plates 5, respectively. In the preferred embodiment, the bores 13, 14, 15 and 16 are eccentric, that is they do not pass through the centers of the anode plates 2, membranes 3, cathode plates 4 and intermediate separator plates 5, rather they are positioned relatively close to the outer perimeter areas of these membranes and plates. Alternately described, they pass through the outer periphery of each membrane or plate. The bore 13 of each anode plate 2 is provided with seal means, specifically annular sealing gasket 17, FIG. 2, formed from a sealing material such as an O-ring.

Referring to FIG. 2, sealing means such as O-ring 18, generally surrounds the outer perimeter or edge of each cathode plate 4. That is, each cathode plate 4 includes an annular ring 18 around a circumferential area thereof, FIG. 1.

The plurality of cells 1 are assembled between two end plates 19 and 20, FIG. 1. Preferably the end plates 19 and 20 are manufactured from a non-porous, electrically conductive, material. Thus, while fluid cannot flow therethrough, the end plates are conductive and may be used as terminii for electrical connections. Referring to FIG. 1, preferably the end plates 19 and 20 are each connected to a direct current (D.C.) potential by means of an electrical conductor such as wires 21 and 22, each of which is fixed to a lug, respectively lugs 33 and 34.

Referring to FIG. 2, lug 33 is used to anchor conductor or wire 21 to end plate 19, whereas lug 34 is used to anchor conductor or wire 22 to end plate 20. Lug 33 is shown received within bore 33 ' and lug 34 is shown received in bore 34'. The bores 33' and 34' extend into, but not completely through, end plates 19 and 20 respectively. Preferably, a relative positive voltage is applied to and plate 20 by lug 34, while a source of less positive voltage is applied to end plate 19, by the lug 33. This is indicated by means of the (+) and (−) symbols located at opposite ends of the electrolyzer, FIG. 1.

During operation of the electrolysis appparatus a current is passed between the end plates 19 and 20, and thus through the series of cells 1. Generally, current passes between the anode plate 2 and the cathode plate 4 of each cell, by means of the membrane 3. The voltage potential across the electrolyzer from end plate 20 to end plate 19 is, theoretically, generally evenly divided across the series of cells 1. Therefore, if, for example, the electrolyzer contains ten cells, the theoretical voltage potential between the cathode and anode of each cell will be approximately equal to one-tenth (1/10) of the voltage potential applied across the electrolyzer between the end plates 19 and 20. However, it will be understood that in some instances variations may be developed, especially if not all cells 1 are identical.

In the preferred embodiment, and especially for reasons of inhibiting corrosion, each end plate 19 and 20 is separated from its first adjacent end cell 1 by means of an intermediate plate, respectively plates 35 and 36, of corrosion resistant, non-porous, electrically conductive material. Preferably plates 35 and 36 are manufactured from titanium.

Referring again to FIG. 1, in the preferred embodiment each end of the electrolyzer includes a flange plate, 37 and 38 respectively, positioned to direct pressure against the outside of each end plate, respectively end plates 19 and 20. Preferably electrically insulating means are provided between the flange plates 37 and 38, and the adjacent end plates 19 and 20 respectively. The electrically insulating means may, for example, be rubber plates 39, with appropriate apertures cut therein.

Referring again to FIG. 1, preferably the diameter of the flange plates 37 and 38 is substantially greater than the diameter of the membranes 3, and the other plates, for example anode plates 2, cathode plates 4 and separator plates 5, positioned therebetween. The membranes 3 and plates 2, 4 and 5, respectively, are all pressed together between the flanges 37 and 38, by means of tie bolts 40. The tie bolts 40 are of a generally conventional construction and extend through openings 41 spaced around the outer portions of the flange plates 37 and 38. The tie bolts 40 are secured by nuts 42, which enable the flange plates 37 and 38 to be urged toward one another upon tightening. This leads to a secure compressing of the rubber plates 39, and the various sealing gaskets, within the electrolyzer.

In the preferred embodiment a cylindrical housing 43, FIG. 1, is positioned around the apparatus and contains the series of cells 1 between the flange plates 37 and 38. Preferably the bolts 40 extend outside of this housing 43.

Referring to FIG. 1, the first flow passage 6 extends from that intermediate plate 35 which is associated with end plate 19, through all of the cells 1, and through to connecting means 44, provided at the opposed end of the electrolyzer. The connecting means 44 is preferably provided with means by which a water conduit or conductor, not shown, can be attached. Thus, one end of the flow passage 6 can be readily contacted by a water source, not shown, by means of connecting means 44, whereas the other end of the flow passage 6 preferably ends at, and abuts, the intermediate plate 35 at the opposite end of the electrolyzer.

In the preferred embodiment the second flow passage 12 extends through the cells 1 and terminates adjacent end separator plate 5', which abuts intermediate plate 35 at the end of the electrolyzer closed by end plate 19. The other end of flow passage 12 communicates with the exterior of the electrolyzer.

Thus, the first flow passage 6 terminates at intermediate plate 35, whereas the second flow passage 12 terminates at the end separator plate 5', FIG. 1. The major difference between the end separator plate 5', alternatively referred to as a "supporting plate", and the intermediate separator plates 5, positioned between the anode and cathode plates of two successive cells, is that no bore analogous to bore 16 in separator plate 5 has been provided in end separator plate 5', as clearly shown in FIG. 2. The result is that the second flow passage 12 is somewhat shorter than the first flow passage 6.

The open end of the second flow passage 12 terminates in connecting means 45, FIG. 1, provided at the end of the electrolyzer that is substantially adjacent to end plate 20. Preferably end connecting means 45 includes means for connection to a conduit or fluid conduct, not shown.

In the preferred embodiment end plate 20, the adjacent rubber plate 39, and the associated flange plate 38, have two sets of openings or bores extending completely therethrough. The first set of bores, 46, 47 and 48, through end plate 20, rubber plate 39 and flange plate 38 respectively, are aligned generally coaxial with the first flow passage 6. A second set of bores 49, 50 and 51, through end plate 20, rubber plate 39 and flange plate 38 respectively, are aligned generally coaxial with the second flow passage 12.

Referring to FIG. 1, the connecting means 44, in the preferred embodiment, comprises an insert, having a flanged end 52, which is positioned in the series of openings 46, 47 and 48. The flanged end 52 is snugly fitted with a counter bore portion 53 of the opening 46 in the end plate 20. A sealing ring 54 is provided within an appropriate receiving space in the inner face of insert 44, so as to provide a tight seal between the insert 44 and the intermediate plate 36, when the end plate 20 is pressed against the intermediate plate 36.

In the preferred embodiment, connecting means 45 of the second flow passage 12 is generally similar to the connecting means 44, and includes a flanged end disposed in a counter bore, wherein a sealing ring provides also a liquid and gas tight seal between the connecting means 45 and the intermediate plate 36. The inserts comprising both connecting means 44 and 45 are preferably made of an appropriate material for connection to fluid conduits, not shown, and each has a central bore 55 therethrough, which communicates with the corresponding flow passages, respectively flow passages 6 and 12. In the preferred embodiment, the free end of each insert 44 and 45, which extends out of the flange plate 38, is threaded, as shown by reference 56, so that a fluid conduit or conductor may be readily attached thereto, in a relavitely quick disconnect fashion.

As indicated above, in the preferred embodiment of the invention the anode plates 2, membranes 3, cathode plates 4, separator plates 5, end plates 19 and 20, intermediate plates 35 and 36, flange plates 37 and 38 and rubber plates 39 are all generally circular. However, for the preferred embodiment they are not all of the same diameter.

Specifically, the diameter of the membranes 3 is preferably slightly larger in diameter than the anodes 2, so the membranes 3 can be arranged side-by-side to the anode plates 2, with an outer periphery of the membranes 3 extending beyond an outer periphery of the anode plates 2.

The cathode plates 4, on the other hand, have a slightly smaller diameter than the anode plates 2. The separator plates 5 preferably have a slightly larger diameter than the cathode plates 4, but are preferably not greater in diameter than the anode plates 2.

Referring to FIG. 1, the cylindrical housing 43 is positioned around the various cells 1 in a manner forming an annular space or jacket 58 between an inner wall 59 of housing 43 and the cells 1. An opening 63 in the housing 43 permits communication between the jacket 58 and the exterior of the electrolysis apparatus, for withdrawing fluid from the cells 1. In this manner the electrolysis apparatus can be cooled, through the withdrawal of heated fluid therefrom.

A seal such as O-ring 60 is located in an annular recess 57 provided at each end of the housing 43. Each of the intermediate plates 35 and 36 has an O-ring 60 associated therewith, positioned between the respective intermediate plate 35 or 36, and the housing 43. This aids in preventing fluid from leaking out of the jacket 58.

Particular advantages are derived from the nature of the separator plates 5 and 5' which, according to the invention, each have means associated therewith for retaining an annular sealing gasket 18 around the outside perimeter of an associated cathode plate 4. That is, each separator plate 5 and 5' includes means for supporting the next associated sealing gasket 18 in position.

In the preferred embodiment, FIGS. 1 and 2, the separator plates 5 and 5' each have a lip 65 extending laterally outwardly from a side of the separator plate facing the next adjacent cathode plate 4. The lip 65 is generally mounted on an outer peripheral area of the associated separator plate, and may be integral therewith. In the preferred embodiment, the lip 65 is adjacent to the outer perimeter of the separator plate 5 or 5', however this is not required. The lip 65, it will be understood from FIG. 1, fits around the outside of the sealing gasket 18, generally trapping the sealing gasket 18 in position against the outer perimeter of the cathode plate 4.

As indicated above, the intermediate separator plates 5 each have a central bore 10 therein. According to the invention each bore 10 is bordered by a lip 66 extending laterally outwardly from the separator plates 5 in the same direction as lip 65. The lip 66 comprises a retaining means positioned for holding the annular sealing gasket 11 in position against the bore 9 in the associated cathode plate 4.

A particular advantage to the design chosen for the separator plates 5 of the present invention, and the means associated therewith for retaining sealing gaskets in association with the cathode plates 4, is that the lips 65 and 66 may be formed substantially simultaneously during a stamping operation.

It will be understood that since the lip 65 extends to the outside of the annular sealing gasket 18, around the cathode plate 4, if a pressure is created inside the cathode plate 4 by produced hydrogen gas, the lip 65 will tend to hold the gasket 18 in place against the pressure. Thus, the electrolysis apparatus according to the present invention will generally be relatively resistant to rupture during use.

Further, for the preferred embodiment, when the separator plates 5 and 5' are pressed against adjacent cathode plates 4, each gasket 18 may be pressed between a separator plate, 5 or 5', and the membrane 3, if the gasket 18 is of appropriate dimension. In this manner the sealing gaskets 18 substantially reduce the risk that any fluid containing hydrogen, flowing through the cathode plates 4, will escape into the annular space or jacket 58. Rather, fluid in the cathode plate 4, containing hydrogen, will tend to flow into flow passage 12, as described below.

The anode plates 2 are preferably composed of a sintered metal substrate, such as titanium, and have an open porous structure. Preferably the porosity is between about 30 and 80 percent, and most preferably between about 40 and 50 percent. The substantial porosity is important, since it enables liquid diffusion, in a substantially homogenous way, from the central bore 7 provided in the center of the anode plate 2, outwardly through substantially the entire volume of the anode plate 2. It has been found that, in an unexpected way, the diffusion happens without any preferred directions, so that it is not necessary to provide grooves for obtaining a regular distribution of liquid flow through the anode plate 2, and especially at the interface of the anode plate 2 with the adjacent membrane 3. The utilization of a structure in which grooves may be avoided leads to numerous advantages, including the following:

First, a complete surface of the membrane material, of each membrane 3, that forms the electrolyte, is in contact with one of the anode plates 2. Thus, there is, generally, a lower current density and a higher cell efficiency, so that possibly less electricity is used by each cell 1. This results in a relative decrease in the cost of generating hydrogen.

Secondly, since grooves are not required, the anode plates 2 can be substantially flat on both sides, lowering considerably the fabrication costs of the anode plates 2. Also, by avoiding grooves, it is possible to make the anode plates 2 much thinner than in previous designs which, also, results in a substantial cost savings. Preferably, the thickness of the anode plates 2 for the preferred embodiment is between about 0.5 millimeters and about 1.5 millimeters, with the most preferred anode plates being about 0.6 to 1.0 millimeters in thickness, however other sizes may be used.

Another advantage is that liquid diffusion within the sintered substrate, that is the anode plates 2, is generally quite uniform, leading to good cooling of the cells 1 without the formation of substantial hot spots. Also, the construction described leads to a relatively easy method of connection of a liquid inlet to the electrolyte plates.

In the preferred embodiment at least the surface of the anode plates 2, which contacts the membrane 3, may be treated with a catalyst coating, such as platinum, preferably in a manner so that the anode plates 2 retain their porosity.

Referring in particular to FIG. 1, the operation of the electrolyzer, to produce hydrogen and oxygen according to the invention, is as follows:

Water is introduced under pressure into the first flow passage 6, through the insert 44, as indicated by arrow 67. The water diffuses into the various anode plates 2 from the central bores 7 provided in each anode plate 2. This is indicated generally by arrows 68. Generally, in this manner, the water is conveyed radially from the center of each anode plate 2 through its porous structure, and outwardly toward its perimeter, so as to substantially wet the entire volume of the anode plates 2. The water also diffuses to the interface 69 between the anode plates 2 and adjacent membranes 3, so as to wet the membranes 3. It is noted that water is generally prevented from diffusing directly from the first flow passageway 6 into the cathode plates 4 by the sealing rings 11.

The means for directing the fluid flow through portions of the apparatus, generally by interaction of passages, seals and porous membranes, is generally referred to herein as a "flow directing means." Also, it is noted that when a seal is said to act to generally prevent fluid flow between two members, the sealing action is usually effective regardless of the direction of attempted flow.

Through the application of an electric potential between end plate 19 and end plate 20, an electrical current is produced within the various cells 1, so that the water is electrolyzed at interfaces 69 to provide oxygen gas and hydrogen ions; the hydrogen ions generally taking the form of hydronium ions in the aqueous environment. The ions transmit charge through the membrane 3, as indicated by arrow 70, to the cathode plates 4. At the cathode plates 4, the electrolysis is completed producing water and hydrogen gas. The water and hydrogen gas flows, under pressure, into the second flow passage 12, as indicated by the arrows 71, and is evacuated at the flange plate 38, as indicated by arrow 72. Again, the mixture of water and hydrogen gas is prevented from flowing into the jacket 58 by the outer seals 18. Further, the mixture is prevented from flowing into the first flow passage 6 by means of the sealing rings 11. Finally, water from the cathode plates 4, possibly including oxygen dissolved therein, is prevented from flowing into the second flow passage 12, and thus contaminating the hydrogen/water product of the electrolysis, by the sealing ring 17 positioned in each anode plate 2.

Water that has been fed to the anode plates 2, through the first flow passage 6, and which does not cross the membranes 3, or which has not been decomposed at the interface 69, is discharged at the perimeter of each anode plate 2, as indicated by arrow 73, into the annular space or jacket 58. This water, which will have been charged with oxygen due to the electrolysis, may be evacuated through opening 63 in the housing 43, as indicated by arrow 64.

As a result of the above structure, a very compact construction of assembled cells 1 is possible; and hydrogen can be produced at relatively high pressure with generally reduced likelihood of rupturing problems. Thus, the fluid flow from insert 45, in the direction of arrow 72, can contain a relatively high pressure of hydrogen.

Further, the particular design chosen allows for little or no cell water or hydrogen to come into contact with any metal inside the cells 1, except for titanium metal, or the platinum coating on the anode plates 2. This, generally, will lead to reduction in corrosion and electrolyte side reactions.

As indicated above, in flow passages 6 and 12, for the preferred embodiment, O-rings are used as sealing gaskets. This makes it possible to apply relatively high pressures inside the flow passages 6 and 12, without substantial risk of leakage. Further, this can be accomplished relatively inexpensively and easily.

Applications of the previously described invention in various modified embodiments will be readily apparent. For example separator plates 5 or 5' having retaining means associated therewith, for an annular sealing gasket such as gasket 18, may be used in association with a more conventional, grooved, anode plate. While it is believed that such a plate would be less desirable in most instances, especially due to cost, advantages in sealing and less rupturing over conventional systems would generally result from such an arrangement.

Further, it would be possible, according to the invention, to combine an anode plate 2, as described hereinabove, with a cell utilizing back-up rings rather than retaining means on separator plates, for retaining sealing rings around the perimeter of the cathode plate 4. That is, conventional back-up rings such as fiberglass back-up rings could be used in association with anode plates according to the present invention, for example in the absence of retaining means mounted on separator plates.

The relative thicknesses of the cathode plates and membranes in the electrolyzer do not necessarily need to correspond to those relative thicknesses shown in the drawings. Generally, they are relatively thin and can have a thickness of less than 0.5 millimeters. It will be understood, however, that a variety of thicknesses will be operable.

In the preferred embodiment, each cell was described with the water inlet passageway located in the center of the circular cell, and with the water outlet passageway, for an evacuation of the water and hydrogen gas mixture, eccentrically positioned. While this arrangement may be preferred, especially for use of greater area or volume of the cathode and anode plates, as well as a ready diffusion of water, the inlet passageway need not be centrally located. That is, the inlet passageway might be located in a position other than at the centers of the plates. Further, the outlet passageway might not be eccentrically positioned, with respect to the centers. It will be further understood that in some applications of the instant invention non-circular plates and membranes may be used, with the remainder of the assembly appropriately modified; for example sealing rings might have a different shape.

It is to be understood that while certain embodiments of the present invention have been illustrated and described, it is not to be limited to the specific forms or arrangement of parts herein described as shown.

What is claimed and desired to be secured by Letters Patent is as follows:

1. An electrolysis apparatus comprising:
   (a) at least one elctrolysis cell including an anode plate and a cathode plate;
      (i) each of said anode and cathode plates having an outer perimeter and having an open porous structure substantially permeable by a liquid, such as water;
   (b) a solid electrolyte membrane positioned in said cell between each of said anode and cathode plates;
   (c) said electrolysis cell having a first flow passage extending generally longitudinally therethrough;
   (d) first seal means substantially preventing fluid flow communication directly between said first flow passage and said cathode plate;
   (e) said electrolysis cell having a second flow passage extending generally longitudinally therethrough;
   (f) second seal means substantially preventing fluid flow communication directly between said anode plate and said second flow passage;
   (g) third seal means associated with said outer perimeter of said cathode plate, to substantially prevent fluid flow outwardly from said cathode plate along said outer perimeter thereof; and
   (h) fluid flow directing means providing fluid flow into said electrolysis cell via said first flow passage and permitting fluid flow into said open porous anode plate from said first flow passage;
      (i) said fluid flow directing means permitting fluid flow substantially throughout said anode plate with a portion of said fluid flow directed through said membrane and into said cathode plate, and with a substantial portion of said fluid flow directed through said porous structure of said anode plate and outwardly of said anode plate to an outer perimeter thereof;
      (ii) said fluid flow directing means further permitting fluid flow from said anode plate and membrane through said cathode plate, into said second flow passage therefrom, and out of said electrolysis cell;
   (i) whereby when a direct current is applied between said anode and cathode plates and said fluid comprises water: a water stream may be fed into said elctrolysis cell by means of said first flow passage, and into said anode plate whereat partial electrolysis may occur forming oxygen gas, said oxygen gas generally being carried outwardly from said electrolysis cell by fluid flow outwardly from said anode plate outer perimeter; and including
   (j) means for providing for fluid flow and electrolyte communication from said anode plate through said membrane to said cathode plate, during electrolysis, so as to generate hydrogen gas formation at said cathode plate, and such that said hydrogen gas generally is removed from said electrolysis cell by means of fluid flow into said second flow passage and outwardly of said electrolysis apparatus.

2. An electrolysis apparatus according to claim 1 wherein:
   (a) said anode plate, cathode plate and membrane substantially circular;

(b) said first flow passage extends generally through centers of said anode plate, cathode plate and membrane; and
(c) said second flow passage extends generally parallel to, and spaced from, said first flow passage.

3. An electrolysis apparatus according to claim 1 wherein:
(a) said anode plate is a sintered metal substrate having a porosity of between about 30% and 80%.

4. An electrolysis apparatus according to claim 1 wherein:
(a) a side of said anode plate facing said membrane is substantially flat.

5. An electrolysis apparatus according to claim 4 wherein:
(a) said anode plate is between about 0.5 and about 1.5 millimeters thick.

6. An electrolysis apparatus according to claim 2 including:
(a) a housing surrounding said electrolysis cell and forming a drainage jacket for receipt of fluid from said outer perimeter of said anode plate.

7. An electrolysis apparatus according to claim 1 wherein:
(a) said third seal means includes a cathode perimeter sealing gasket and a separator plate;
  (i) said cathode perimeter sealing gasket substantially surrounding said cathode outer perimeter and preventing fluid flow therefrom;
  (ii) said separator plate being non-porous and positioned with a side thereof generally facing a side of said cathode plate that is opposite a side of the cathode plate that faces said membrane; said separator plate having an outer periphery with means thereon for engaging said cathode perimeter sealing gasket and retaining same against said cathode plate outer perimeter;
(b) whereby fluid containing hydrogen is substantially prevented from flowing outwardly from said cathode plate outer perimeter by said cathode perimeter sealing gasket; and,
(c) whereby said cathode perimeter sealing gasket is held substantially in place by said separator plate.

8. An electrolysis apparauts according to claim 7 wherein:
(a) said means on said separator plate for retaining said cathode perimeter sealing gasket in position comprises a lip member on an outer periphery of said separator plate.

9. An electrolysis apparatus comprising:
(a) a plurality of electrolysis cells, each cell having an anode plate, a cathode plate and a solid electrolyte membrane;
  (i) each of said anode and cathode plates having an outer perimeter and having an open porous structure substantially permeable by a liquid, such as water;
  (ii) at least one solid electrolyte membrane being positioned between said anode plate and said cathode plate of each cell;
(b) retaining means for supporting said plurality of electrolysis cells in a series;
(c) said series of electrolysis cells having a first flow passage extending generally longitudinally therethrough;
(d) first seal means substantially preventing fluid flow communication directly between said first flow passage and said cathode plates;
(e) said electrolysis cells having a second flow passage extending generally longitudinally therethrough;
(f) second seal means substantially preventing fluid flow communication directly between said anode plates and said second flow passage;
(g) third seal means associated with said outer perimeter of each of said cathode plates, to substantially prevent fluid flow outwardly from said cathode plates along said outer perimeters thereof;
(h) separator means substantially preventing fluid flow directly between adjacent electrolysis cells except by means of said first and second flow passages; and
(i) fluid flow directing means providing fluid flow into each electrolysis cell via said first flow passage by permitting fluid flow into said open porous anode plates from said first flow passage;
  (i) said fluid flow directing means permitting fluid flow substantially throughout said anode plates with a portion of said fluid flow being directed through adjacent membrane material and into associated cathode plates, and with a substantial portion of said fluid flow being directed through the porous structure of said anode plates and outwardly of said anode plates to outer perimeters thereof;
  (ii) said fluid flow directing means further permitting fluid flow from said anode plates and membranes through said associated cathode plates, and into said second flow passage therefrom, and ultimately out of said electrolysis cells;
(j) whereby when an electrical potential is applied between said anode and cathode plates, of each cell, and said fluid comprises water: a water stream may be fed into said electrolysis cells, by means of said first flow passage, and into said anode plates whereat partial electrolysis may occur forming oxygen gas, said oxygen gas generally being carried outwardly from said electrolysis cells by said fluid flow outwardly from said outer perimeters of said anode plates; and including:
(k) means for providing for fluid flow and electrolyte communication from said anode plates, through said membranes, and into said cathode plates during electrolysis so as to generate hydrogen gas formation at said cathode plates, and such that said hydrogen gas generally is removed from said electrolysis cells by means of fluid flow into said second flow passage and outwardly of said electrolysis apparatus.

10. An electrolysis apparatus according to claim 9 wherein:
(a) said anode plates, cathode plates and membranes are substantially circular;
(b) said first flow passage extends generally through centers of said anode plates, cathode plates and membranes; and
(c) said second flow passage extends generally parallel to, and spaced from, said first flow passage.

11. An electrolysis apparatus comprising:
(a) at least one electrolysis cell including an anode plate and a cathode plate;
  (i) each of said anode and cathode plates having an outer perimeter and having an open porous structure substanatially permeable by a liquid, such as water;

(b) a solid electrolyte membrane positioned in said cell between each of said anode and cathode plates;
(c) said elctrolysis cell having a first flow passage extending generally longitudinally therethrough; said first flow passage including in axial alignment a first bore extending through said anode plate, a second bore extending through said membrane and a third bore extending through said cathode plate;
(d) first seal means substantially preventing fluid flow communications directly between said first flow passage and said cathode plate;
 (i) said first seal means comprising an O-ring seal positioned in said first flow passage third bore;
(e) said electrolysis cell having a second flow passage extending generally longitudinally therethrough;
(f) second seal means substantially preventing fluid flow communication directly between said anode plate and said second flow passage;
(g) third seal means associated with said outer perimeter of said cathode plate, to substantially prevent fluid flow outwardly from said cathode plate along said outer perimeter thereof; said third seal means including a cathode perimeter sealing gasket and a separator plate;
 (i) said cathode perimeter sealing gasket substantially surrounding said cathode outer perimeter and substantially preventing fluid flow therefrom;
 (ii) said separator plate being substantially nonporous and being generally positioned with a side thereof facing a side of the cathode plate that is opposite a side of the cathode plate that faces said membrane; said separator plate having an outer periphery with means projecting over said sealing gasket thereon for engaging said cathode perimeter sealing gasket and supporting same against said cathode plate outer perimeter; and
(h) retaining means mounted on said separator plate for supporting said first seal means in position.

12. An electrolysis apparatus according to claim 11 wherein:
(a) said means on said separator plate for engaging said cathode perimeter sealing gasket and supporting same against said cathode plate outer perimeter comprises a lip member on an outer periphery of said separator plate; and
(b) said retaining means comprises an annular ring mounted on a central portion of said separator plate and oriented to retain said first seal means in position.

13. An electrolysis apparatus comprising:
(a) at least one electrolysis cell including an anode plate and a cathode plate;
 (i) each of said anode and cathode plates having an outer perimeter;
 (ii) said cathode plate having an open porous structure substantially permeable by a liquid, such as water;
(b) a solid electrolyte membrane positioned in said cell between each of said anode and cathode plates;
(c) said electrolysis cell having a first flow passage extending generally longitudinally therethrough;
(d) an evacuation conduit providing for fluid flow from said cathode plate outwardly from said electrolysis cell substantiallv without flow communication into an interface between said anode plate and said membrane;
(e) first seal means substantially preventing fluid communication directly between said first flow passage and said cathode plate;
(f) cathode plate outer perimeter seal means substantially preventing fluid flow directly outwardly from said cathode plate along said outer perimeter thereof; said cathode plate outer perimeter seal means including a cathode perimeter sealing gasket and a separator plate;
 (i) said cathode perimeter sealing gasket substantially surrounding said cathode outer perimeter and substantially preventing fluid flow directly therefrom;
 (ii) said separator plate being non-porous and being positioned with a side thereof generally facing a side of said cathode plate that is opposite a side of the cathode plate facing said membrane; said separator plate having an outer periphery with means mounted thereon and projecting over said cathode perimeter sealing gasket for engaging said cathode perimeter sealing gasket and retaining same against said cathode plate outer perimeter;
(g) fluid flow directing means providing for fluid flow into said electrolysis cell via said first flow passage and directing fluid flow to said interface between said anode plate and said membrane;
 (i) said fluid flow generally directing means permitting a first portion of fluid directed to said interface to then flow outwardly from said cell, without substantial passage through said membrane and into said cathode plate; and
 (ii) said fluid flow directing means further permitting a second portion of fluid directed to said interface to then flow through said membrane and into said cathode plate and then into said evacuation conduit for evacuation from said electrolysis cell; and
(h) means for providing an electric potential between said anode and cathode plates, and when said fluid originally comprises water; providing means for feeding a water stream into said electrolysis cell through said first flow passage, and to an interface between said anode plate and membrane such that partial electrolysis occurs forming oxygen gas abd providing means to evacuate said oxygen gas from said cell in the first portion of fluid; and
(i) whereby, during electrolysis, fluid flow and electrolyte communication through said membrane and into said cathode plate may result in hydrogen formation in said cathode plate, said hydrogen gas generally being removed from said electrolysis cell by fluid flow into said evacuation conduit.

14. An electrolysis apparauts comprising:
(a) at least one electrolysis cell including an anode plate and a cathode plate;
 (i) each of said anode and cathode plates being generally circular inconfiguration and having an outer perimeter;
 (ii) each of said anode and cathode plates having an open porous structure substantially permeable by a liquid, such as water;
(b) a solid electrolyte membrane positioned in said cell between each of said anode and cathode plates;
 (i) said membrane being generally circular and having a larger diameter than said anode plate, so that said membrane can be arragned adjacent said anode plate with a perimeter of the membrane extending beyond a perimeter of the anode plate;

(ii) said cathode plate having a smaller diameter than said anode plate;

(c) said electrolysis cell having a first flow passage extending generally longitudinally therethrough; said first flow passage including in axial alignment a first bore extending through said anode plate, a second bore extending through said membrane, and a third bore extending through said cathode plate;

(d) first seal means substantially preventing fluid flow communication directly between said first flow passage and said cathode plate;

(e) said electrolysis cell having a second flow passage extending generally longitudinally therethrough;

(f) second seal means substantially preventing fluid flow communication directly between said anode plate and said second flow passage;

(g) third seal means associated with said outer perimeter of said cathode plate, to substantially prevent fluid flow outwardly from said cathode plate along said outer perimeter thereof; said third seal means including a cathode perimeter sealing gasket and a separator plate;

(i) said cathode permeter sealing gasket substantially surrounding said cathode outer perimeter and preventing fluid flow therefrom;

(ii) said separator plate being non-porous and having a generally circular configuration of larger diameter than said cathode plate, but not larger in diameter than said anode plate; said separator plate having integral means projecting therefrom over said cathode plate for retaining said cathode perimeter sealing gasket against said cathode plate outer perimeter and for sealingly supporting said cathode perimeter sealing gasket between said separator plate and a portion of said membrane extending beyond said cathode plate;

(h) retaining means mounted on said separator plate for supporting said first seal means in position;

(i) first flow means for evacuating fluid containing oxygen, generally formed at an interface between said anode plate and said membrane during electrolysis cell operation, from said electrolysis cell without substantial passage into said second flow passage; and (j) second flow means for evacuating fluid containing hydrogen, formed at said cathode plate, from said electrolysis cell by passage into said second flow passage.

15. A method for electrolysis of water to produce hydrogen and oxygen therefrom; said method comprising the steps of:

(a) providing at least one electrolysis cell including a solid electrolyte membrane positioned between an open porous anode plate and an open porous cathode plate;

(i) said anode plate and said cathode plate contacting mutually opposite sides of said membrane;

(b) wetting, with water, surfaces of said anode and cathode plates which abut said membrane;

(i) said wetting being by providing conveyance of water into and substantially radially through said anode plate from a central portion of said anode plate toward an outer perimeter thereof; and (c) passing a current through said electrolysis cell to generate hydrogen gas at said cathode plate and oxygen gas at said anode plate.

16. A method according to claim 15 wherein:

(a) said anode plate is provided with two, opposite, substantially flat sides, one of which abuts said membrane.

17. In an electrolysis apparatus for producing hydrogen from electrolysis of water and including an anode, cathode and an electrolyte membrane between said anode and said cathode; the improvement wherein:

(a) said anode is constructed of sintered metal having interior pores; and (b) including channel and sealing means to convey said water to said anode and to flow a substantial amount of said water to be electrolyzed through said pores of said anode during electrolysis such that a first portion of said water is electrolyzed and a second portion of said water passes through said anode.

18. The apparatus according to claim 17 wherein:

(a) said anode has a surface facing said membrane; and wherein:

(b) substantially said entire anode surface is in direct contact with said membrane whereby substantially all water to be electrolyzed in said apparatus passes into and through said anode until such water is electrolyzed or exits said anode at a spaced location from whereat the water passes into said anode.

* * * * *